(12) United States Patent
Delorme et al.

(10) Patent No.: US 8,824,530 B1
(45) Date of Patent: Sep. 2, 2014

(54) COMMUNICATION SYSTEM AND METHOD

(71) Applicant: Nvidia Corporation, Santa Clara, CA (US)

(72) Inventors: Flavien Delorme, Sophia Antipolis (FR); Farouk Belghoul, Grasse (FR); Pete Cumming, Bristol (GB)

(73) Assignee: Nvidia Corporation, Santa Clara, CA (US)

( * ) Notice: Subject to any disclaimer, the term of this patent is extended or adjusted under 35 U.S.C. 154(b) by 81 days.

(21) Appl. No.: 13/773,210

(22) Filed: Feb. 21, 2013

(51) Int. Cl.
*H04B 1/38* (2006.01)
*H04B 1/04* (2006.01)

(52) U.S. Cl.
CPC ........................................ *H04B 1/04* (2013.01)
USPC ............ 375/222; 375/219; 375/295; 375/316

(58) Field of Classification Search
CPC ........................................................ H04B 1/04
USPC .................................. 375/222, 219, 295, 316
See application file for complete search history.

(56) References Cited

U.S. PATENT DOCUMENTS

| | | | | |
|---|---|---|---|---|
| 5,566,352 A * | 10/1996 | Wishneusky | ................... | 710/48 |
| 6,453,024 B1 * | 9/2002 | Baker et al. | ................ | 379/93.29 |
| 6,859,503 B2 * | 2/2005 | Pautler et al. | ................. | 375/299 |
| 8,615,568 B2 * | 12/2013 | Matsuzawa | .................... | 709/219 |
| 2004/0062383 A1 * | 4/2004 | Sylvain | ..................... | 379/265.06 |
| 2008/0244148 A1 * | 10/2008 | Nix et al. | ....................... | 710/313 |
| 2008/0292074 A1 * | 11/2008 | Boni et al. | ................. | 379/93.11 |
| 2009/0006626 A1 * | 1/2009 | Yamagishi | ..................... | 709/226 |
| 2009/0280789 A1 * | 11/2009 | Takuno et al. | ................. | 455/418 |
| 2010/0175100 A1 * | 7/2010 | Ogasawara | .................... | 725/114 |

* cited by examiner

*Primary Examiner* — Kenneth Lam

(57) ABSTRACT

A modem for handling notifications received over a network is disclosed. In one embodiment, the modem includes a first interface to connect to a network, a second interface to connect to a host processor on a terminal and a modem processor to receive presence configuration information from the host processor and in response thereto transmit a request comprising the presence configuration information to a presence information store. The modem processor further arranged to receive one or more notifications with presence information from the store based on the presence configuration information in the request. The presence information supplied to the store by one or more further terminals associated with one or more users. The modem processor stores the one or more notifications in a storage means, and in response to receiving a request for presence information from said host processor, supply presence information thereto based on the one or more notifications.

19 Claims, 4 Drawing Sheets

COMMUNICATION SYSTEM AND METHOD

TECHNICAL FIELD

The disclosure relates to a modem for use at a terminal. In particular the disclosure relates to handling notifications received over a network at the modem.

BACKGROUND

FIGS. 1a and FIG. 1b are schematic block diagrams of communication systems comprising a host terminal 2 and a modem 4. The host terminal 2 may be a user terminal, and may for example take the form of a desktop computer, laptop computer, tablet style computer, or mobile phone (which may be referred to as a "smart phone"). As shown in FIG. 1a, the modem 4 may for example take the form of a dongle for plugging into the host terminal 2 such that the modem 4 is connected to a host processor 30 (otherwise referred to as an application processor) of the host terminal 2. Alternatively the modem 4 may take the form of a mobile phone handset which, as well as being a conventional mobile telephone, can be connected to the host terminal 2 so as to act as an external cellular modem for the host terminal 2. As shown in FIG. 1a, the modem 4 may be external to the host terminal 2 in that it is a separate unit housed in a separate casing, but which is connected or connectable to the host processor 30 of the host terminal 2 by means of a wired or wireless connection (as well as being removable or being able to be disconnected from the host terminal 2). In another alternative set up, as shown in FIG. 1b, the modem 4 may be internal to the host terminal 2, e.g. taking the form of a wireless module in the host terminal 2. For example, both the modem 4 and host processor 30 may be housed within the same casing of the host terminal 2. For example the modem 4 may be internal to a mobile phone 2, and connected to the host processor 30 of the mobile phone 2 by way of a wired connection.

The system also comprises a network 6 such as a mobile cellular network 6 (3GPP network or other CDMA network). Elements of the network 6 are well known to those skilled in the art and are not discussed herein.

For connecting to the mobile cellular network 6, the modem 4 comprises a first interface.

With reference to the communication system shown in FIG. 1a, the first interface may comprise a wireless transceiver, typically in the form of a radio frequency (RF) transceiver and an antenna 5. The first interface of the modem 4 connects via an antenna (not shown) of the mobile cellular network 6 enabling the modem 4 to establish a channel between itself and the mobile cellular network 6.

With reference to the communication system shown in FIG. 1b, the first interface may comprise a wired connection to an interface on the host terminal. The interface on the host terminal may comprise a wireless transceiver, typically in the form of a radio frequency (RF) transceiver and an antenna 5. The interface on the host terminal 2 connects via an antenna (not shown) of the mobile cellular network 6 enabling the modem 4 to establish a channel between itself and the mobile cellular network 6.

This channel referred to above may be referred to as a "context". For example, if the mobile cellular network is a 3GPP network, then the connection between the modem 4 and a 3GPP network 6 may be called a PDP (Packet Data Protocol) context in 2G or 3G terminology, and an EPS (Evolved Packet System) bearer context in LTE (Long Term Evolution standards) terminology. The physical medium of the connection is typically a radio channel such as a 2G, 3G or LTE radio channel and the protocol that drives it may comprise a set of protocol layers as defined for example by 3GPP. The mobile cellular network 6 may be coupled to a further, packet-based network, for example a wide area internetwork such as the Internet, by way of one or more gateway routers.

For connecting to the host processor 30 on the host terminal 2, the modem 4 comprises a second interface.

With reference to the communication system shown in FIG. 1a, the second interface, between the host processor 30 and modem 4, could for example comprise a wired connection such as USB, or a short-range wireless transceiver such as an infrared connection or a radio frequency connection (e.g. Bluetooth).

With reference to the communication system shown in FIG. 1b, the second interface, between the host processor 30 and modem 4, could for example comprise a wired connection within the host terminal 2.

SUMMARY

According to one aspect, the disclosure provides a modem for use at a terminal. In one embodiment the modem includes: (1) a first interface arranged to connect to a network, (2) a second interface arranged to connect to a host processor on the terminal and (3) a modem processor arranged to receive presence configuration information from the host processor via the second interface and in response to receiving the presence configuration information the modem processor is arranged to transmit a request including the presence configuration information via the first interface to a presence information store. The processor is further arranged to receive one or more notifications with presence information from the presence information store via the first interface based on the presence configuration information in the request, the presence information supplied to the presence information store by one or more further terminals associated with one or more users. The modem processor is further arranged to store the one or more notifications in a storage means coupled to the processor, and in response to receiving a request for presence information from said host processor via the second interface, to supply presence information to the host processor based on the one or more notifications stored in the storage means.

According to another aspect of the disclosure there is provided a computer program product for operating a modem for use at a terminal, the modem having a modem processor, a first interface for connecting to a network, and a second interface for connecting to the terminal. In one embodiment, the computer program product includes code embodied on a non-transitory computer-readable medium and configured so as when executed on the modem processor to: (1) receive presence configuration information from the terminal via the second interface, (2) in response to receiving the presence configuration information, transmit a request comprising the presence configuration information via the first interface to a presence information store, (3) receive one or more notifications with presence information from a presence information store via the first interface based on the presence configuration information in the request, the presence information supplied to the presence information store by one or more further terminals associated with one or more users, (4) store the one or more notifications in a storage means and (5) receive a request for presence information from said host processor via the second interface and in response to receiving said request, supply presence information to the host processor based on the one or more notifications stored in the storage means.

According to yet another aspect, the disclosure provides a method of operating a modem at a terminal, the modem having a first interface for connecting to a network and a second interface for connecting to a host processor on the terminal. In one embodiment, the method includes: (1) receiving presence configuration information from the host processor via the second interface, (2) in response to receiving the presence configuration information, transmitting a request comprising the presence configuration information via the first interface to a presence information store, (3) receiving one or more notifications with presence information from a presence information store via the first interface based on the presence configuration information in the request, the presence information supplied to the presence information store by one or more further terminals associated with one or more users, (4) storing the one or more notifications in a storage means and (5) receiving a request for presence information from said host processor via the second interface and in response to receiving said request, supplying presence information to the host processor based on the one or more notifications stored in the storage means.

According to still another aspect, the disclosure provides a system including: (1) a terminal, (2) a network and (3) a modem for use at the terminal. In one embodiment, the modem includes: (3A) a first interface arranged to connect to the network, (3B) a second interface arranged to connect to a host processor on the terminal and (3C) a modem processor arranged to receive presence configuration information from the host processor via the second interface and in response to receiving the presence configuration information the modem processor is arranged to transmit a request including the presence configuration information via the first interface to a presence information store. The modem processor is further arranged to receive one or more notifications with presence information from the presence information store via the first interface based on the presence configuration information in the request. The presence information supplied to the presence information store by one or more further terminals associated with one or more users. The modem processor is further arranged to store the one or more notifications in a storage means coupled to the modem processor, and in response to receiving a request for presence information from said host processor via the second interface, to supply presence information to the host processor based on the one or more notifications stored in the storage means.

BRIEF DESCRIPTION OF THE DRAWINGS

For a better understanding of the disclosure and to show how it may be put into effect, reference by way of example is made to the accompanying drawings in which.

DETAILED DESCRIPTION

Figure 1A:
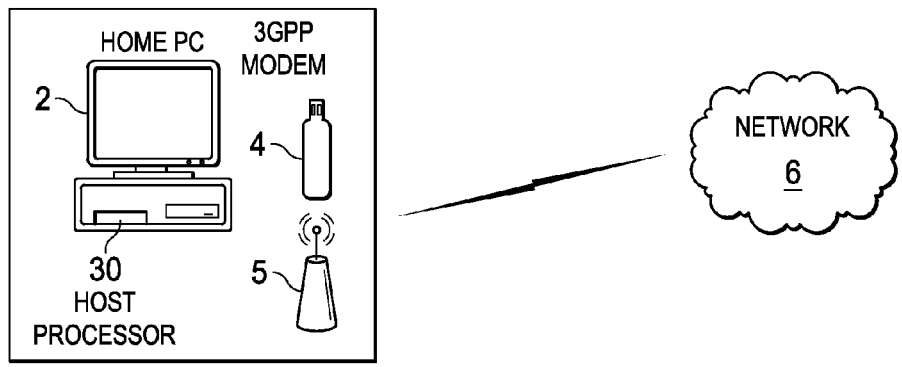
FIG. 1a and FIG. 1b are schematic block diagrams of communication systems comprising a host terminal and a modem.

A contact list on the host terminal 2 of a User Equipment can be used to store the details of various users, or "contacts" with whom the user of the host may want to initiate a communication with, for example a voice or video call, or an instant message (IM).

If the User Equipment supports presence functionality, a user's contact list may be enhanced by associating presence information with contacts in the contact list. Presence information indicates a state characterizing the existence of an active device through which a user can communicate or through which presence can be detected.

As part of the presence functionality, a user can subscribe to different events related to his contacts and the user will receive notification of the corresponding event whenever it occurs.

The disclosure recognizes a problem in that when a host processor 30 on the host terminal 2 is in a sleep mode to save power consumption, the processor 30 will be woken up by a notification every time such an event occurs, significantly increasing the power consumption of the host processor 30.

As noted above, the disclosure provides an embodiment of a modem for use at a terminal that includes: a first interface arranged to connect to a network; a second interface arranged to connect to a host processor on the terminal; and a modem processor arranged to receive presence configuration information from the host processor via the second interface and in response to receiving the presence configuration information the modem processor is arranged to transmit a request comprising the presence configuration information via the first interface to a presence information store; wherein the processor is further arranged to receive one or more notifications with presence information from the presence information store via the first interface based on the presence configuration information in the request, the presence information supplied to the presence information store by one or more further terminals associated with one or more users; wherein the modem processor is further arranged to store the one or more notifications in a storage means coupled to the processor, and in response to receiving a request for presence information from said host processor via the second interface, to supply presence information to the host processor based on the one or more notifications stored in the storage means.

The presence information supplied to the host processor may comprise the one or more notifications stored in the storage means.

The modem processor may be arranged to: upon receiving the request for presence information from said host processor, determine a current status of the one or more users from the one or more notifications received via the first interface, and determine whether the current status is different to a previous status of the one or more users at a time when the modem processor received a previous request for presence information from said host processor; wherein if the current status of the one or more users is different to the previous status of the one or more users, the presence information supplied to the host processor only indicates the current status of the one or more users.

The one or more notifications may be stored in the storage means in the form of one or more Extensible Markup Language (XML) files.

The modem processor may be arranged to transmit the request as a Session Initiation Protocol (SIP) message. The processor may be arranged to receive the one or more notifications in the form of one or more Session Initiation Protocol messages.

The modem processor may be arranged to receive the presence configuration information from the terminal via the second interface in an Attention (AT) Command.

The terminal may comprise a housing and the modem may be an internal module within said terminal housing. The second interface may comprise a wired connector or connection within said terminal housing to connect to the host processor. The first interface may connect to a first wireless transceiver of said terminal for connecting to the network The modem may comprise an external unit for use at the terminal. The second interface may be a Universal Serial Bus (USB) interface. The modem may comprise a dongle housing, the modem for plugging into said terminal via the second interface. The first interface may comprise a first wireless transceiver for connecting to the network. The second interface may comprise a second wireless transceiver for connecting to the terminal via a local wireless connection.

The modem may comprise a mobile phone housing for connecting to said terminal via the second interface, the mobile phone thus being operable as a telephone and as an external wireless cellular modem for the terminal.

Figure 2:
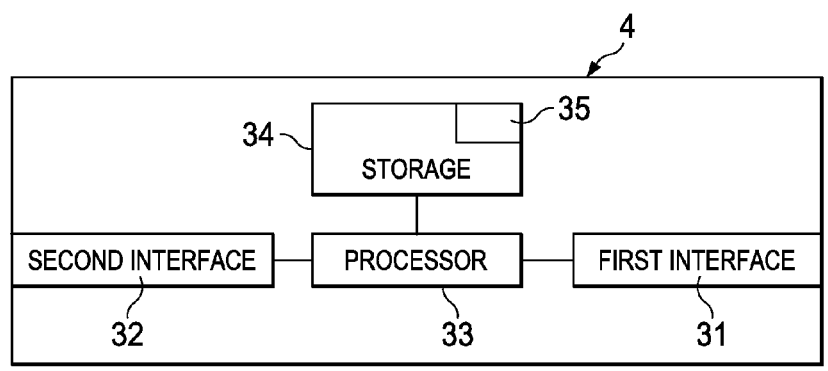
FIG. 2 is a schematic block diagram of an external modem unit for use at a host terminal.

Referring to FIG. 2, the modem 4 may comprise a processor 33 and, operatively coupled to the processor 33, a non-transitory computer-readable storage medium 34 such as a magnetic or electronic memory storing soft-modem code. The code on the storage medium 34 is arranged to be executed on the processor 33, so as when executed to send and receive packets between the host 2 and network 6, and to perform the additional operations of the modem 4 as discussed below. However, the possibility of some or all of the modem functionality being implemented in dedicated hardware is not excluded.

Figure 1B:
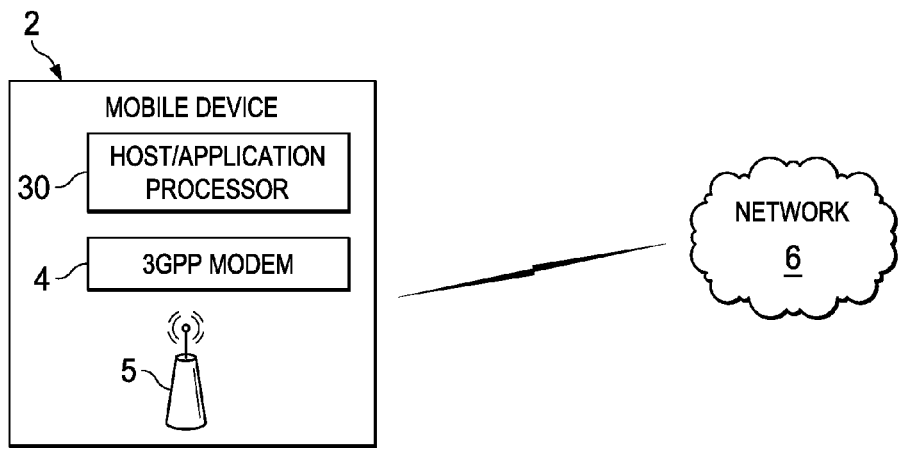

The modem 4 comprises a first interface 31 corresponding to the first interface referred to above with reference to FIG. 1. The modem 4 also comprises a second interface 32 corresponding to the first interface referred to above with reference to FIG. 1. The modem may be configured in a similar manner to that discussed in relation to FIG. 1 above, but with additional functionality added in accordance with the principles of the disclosure, an example of which will be discussed in more detail below.

Figure 3:
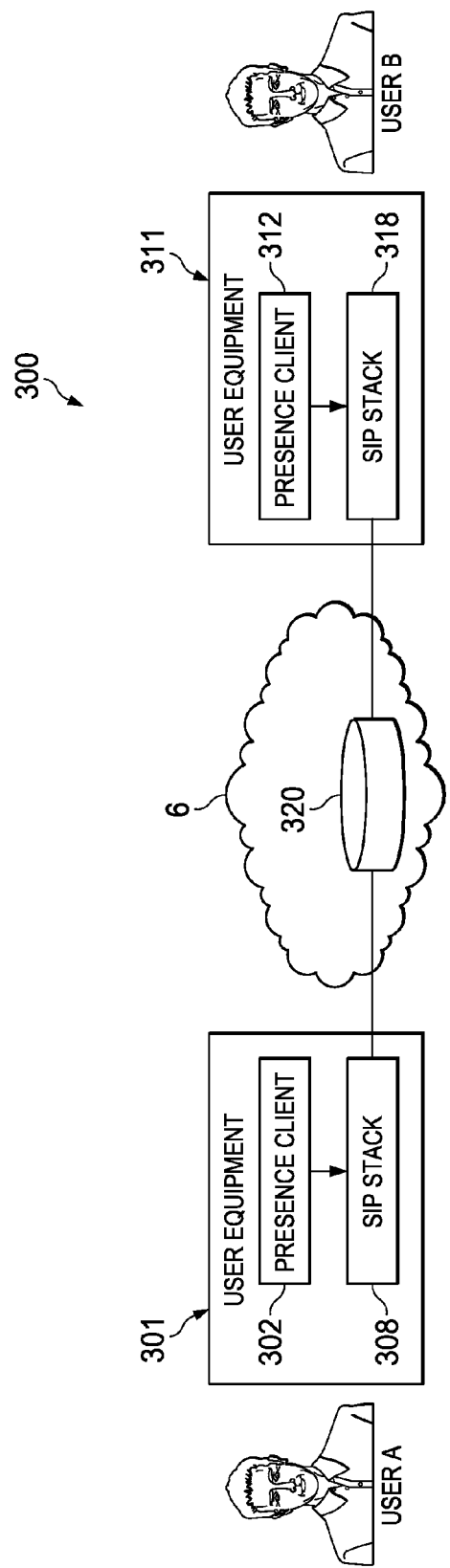
FIG. 3 is a schematic illustration of a presence environment.

FIG. 3 illustrates a conventional presence environment comprising a first User Equipment 301 associated with a user A and a second User Equipment 311 associated with a user B. For reasons of simplicity, the presence environment of FIG. 3 is shown with only two user equipments present, however it will be appreciated that this is merely an example and typically additional user equipments to those shown in FIG. 3 will be present in the presence environment.

The User Equipment 301 executes communication client software (not shown in FIG. 3), typically on a host processor 30 of a host terminal 2. That is, the host processor 30 of the host terminal 2 is coupled to a memory (not shown) which stores communications code arranged to be executed on the processor, and configured so as when executed to engage in communications over the network 6. The communications code comprises a communication client application for performing communications such as voice or video calls or instant messaging (IM) with other terminals over the network. As part of the functionality provided by the communication client application, user A is able to maintain a contact list which can be used to store the details of various users, or "contacts" with whom a user of the communication client application may want to initiate a communication with.

The User Equipment 301 also executes presence client software 302, typically on the host processor 30 of the host terminal 2 which interworks with the communication client application. That is, the host processor 30 of the host terminal 2 is coupled to a memory (not shown) which stores code which when executed on the processor enhances the User A's contact list by associating presence information with contacts in the contact list.

The presence client software 302 may be based for example on the SIMPLE (Session Initiation Protocol for Instant Messaging and Presence Leveraging Extensions) protocol suite based on Session Initiation Protocol (SIP) managed by the Internet Engineering Task Force (ETF).

As well as controlling the display of User A's contact list, the code when executed on the processor 30 of the host terminal 2, also transmits User A's presence information via the modem 4 to the network 6.

A SIP stack 308, typically implemented on a modem 4 of the User Equipment 301 allows for SIP signalled communications to and from the network 6. SIP is an open signalling protocol for establishing many kinds of real-time communication sessions. Examples of the types of communication sessions that may be established using SIP include voice, video, and/or instant messaging.

Two protocols that are often used in conjunction with SIP are the Real Time Protocol (RTP) and the Session Description Protocol (SDP). The RTP protocol is used to carry the real-time multimedia data. SDP is used to describe and encode capabilities of session participants. Such a description is then used to negotiate the characteristics of the session so that all the devices can participate (that includes, for example, negotiation of codecs used to encode media so all the participants will be able to decode it, and negotiation of the transport protocol used).

User Equipment 311 has corresponding functionality through the use of client software 312 and SIP stack 318.

The network 6 comprises a presence information store 320 which accepts, stores and distributes presence information from User Equipment 301 and User Equipment 311.

User A's contact list may store the details of User B to enable User A to initiate a communication with User B. Thus by executing the presence client software 302 User A's contact list is supplemented with presence information of User B. Similarly, User B's contact list may store the details of User A to enable User B to initiate a communication with User A. Thus by executing the client software 312 User B's contact list is supplemented with presence information of User A.

Presence information is a user-defined indication of the current status of a user. Presence information is displayed on the host terminal in the user's contact list for each of the contacts that the user has stored, and allows the user to view the current user-defined status of the contacts in the system. Example presence states that may be displayed include "online", "offline", "away", and "do not disturb". These presence states are mere examples and are not limiting in any way.

As part of the client software functionality, a user can subscribe to different "events" related to his contacts and he will receive notification of the corresponding event whenever it occurs. These events relate to a presence status change in an application that the presence client software 302 is arranged to interwork with. For example, when the host processor executes communication client software referred to above, the events may relate to a presence status change of one or more of the contacts with whom a user of the communication client application may want to initiate a voice call, video call or instant messaging communication with. Whilst communication client software is used as an example, the events may relate to a presence status change in any application that the presence client software 302 is arranged to interwork with.

For computer systems implemented on user devices, such as mobile smart phones and tablets, it is important to keep the power consumption of the computer system at a low level because, for example, the power supply to the user device may be limited. One mechanism to conserve power supply levels is for the host processor 30 on the host terminal 2 to operate in a "sleep" mode. While in the low power (or sleep) mode the host processor 30 is unable to process information, but typically draws a fraction of the electrical current it draws while operating in an active (or awake) mode, where it does process information. Thus the host processor 30 consumes less power when in the sleep mode.

While the host processor 30 is in sleep mode, it may not be appropriate to wake it up every time an event occurs. For example a user may want to receive a communication, for example an Instant Message, as soon as it occurs but not waste power consumption on updating contacts status for contacts in the user's contact list.

In some embodiments, the disclosure provides a modem 4 which implements some of the client software functionality to handle events locally and only inform the host processor 30 on the host terminal 2 of the events when requested by the host processor 30 i.e. event notifications to the host processor 30 on the host terminal 2 are handled by the modem 4 on demand.

Embodiments of the disclosure are described in more detail with reference to FIGS. 4 and 5.

Figure 4:
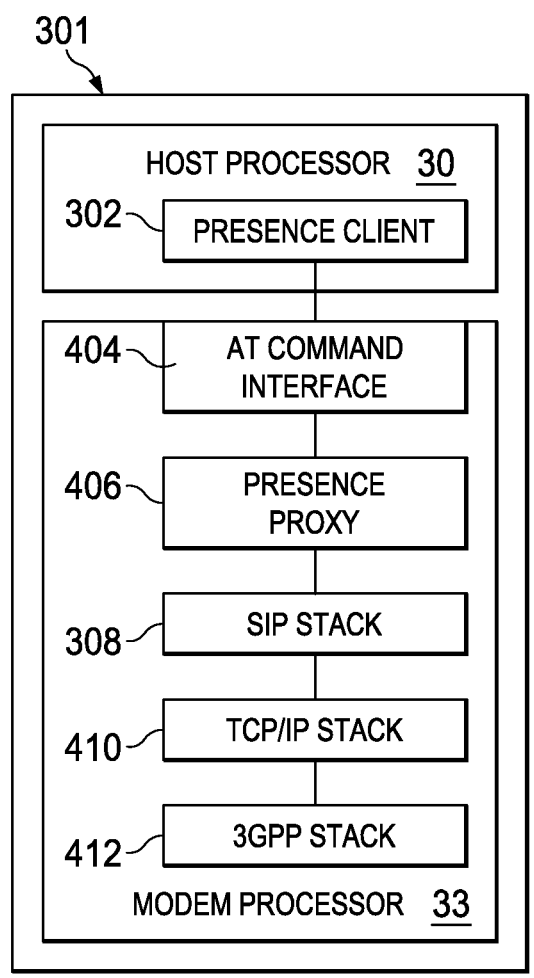
FIG. 4 is a schematic block diagram of a modem processor and a processor at a host terminal.

FIG. 4 illustrates a User Equipment 301 comprising a host processor 30 on the host terminal 2 and the modem processor 33 on the modem 4.

The host processor 30 executes presence client software 302. That is, the host processor 30 is coupled to a memory (not shown) on the host terminal 2 that stores code which when executed on host processor 30 enhances User A's contact list by associating presence information with contacts in User A's contact list.

The modem processor 33 includes an AT (ATtention) command interface 404 for receiving AT commands from the host processor 302. The AT commands received over the AT command interface 404 are used to control the operation for the modem 4 as described in more detail below. A SIP stack 308, TCP/IP stack 410 and 3GPP stack 412 are configured to process data for communication to and from the network 6 according to Internet protocols.

The SIP, TCP, and IP processing (shown by blocks 308 and 410) is implemented in the form of code 35 stored on a non-transitory computer-readable medium 34 of the modem 4 (not necessarily the same physical memory device as the rest of the soft modem code, though it could be) and arranged for execution on the processor 33 of the modem 4 so as to process data for communication to and from the network 6.

The 3GPP stack 412 is configured to process data for communication to and from a mobile cellular network 6 (3GPP network or other CDMA network), the 3GPP stack 412 comprising a set of protocol layers as defined for example by 3GPP for transferring data across a radio channel such as a 2G, 3G or LTE radio channel. As is well known, the protocol stack according to 3GPP comprises a plurality of layers; beginning at the lowest layer is the physical layer PHY which represents the signalling link, then a medium access control (MAC) protocol layer, then a radio link control (RLC) protocol layer and then a packet data convergence protocol (PDCP) layer. The 3GPP protocol stack also includes a number of other higher layers, not discussed herein. The 3GPP protocol stack 412 is implemented in the form of code 35 stored on a non-transitory computer-readable medium 34 of the modem 4 (not necessarily the same physical memory device as the rest of the soft modem code, though it could be) and arranged for execution on the processor 33 of the modem 4 so as when executed to perform the operations described above.

As shown in FIG. 4, part of the functionality of the presence client software 302 has been moved to the modem 4, this is indicated by the presence proxy 406.

The presence proxy 406 is implemented in the form of code 35 stored on a non-transitory computer-readable medium 34 of the modem 4 (not necessarily the same physical memory device as the rest of the soft modem code, though it could be) and arranged for execution on the processor 33 of the modem 4 so as when executed to handle event notification. However, the possibility of some or all of the functionality of the code 35 being implemented in dedicated hardware is not excluded.

Figure 5:
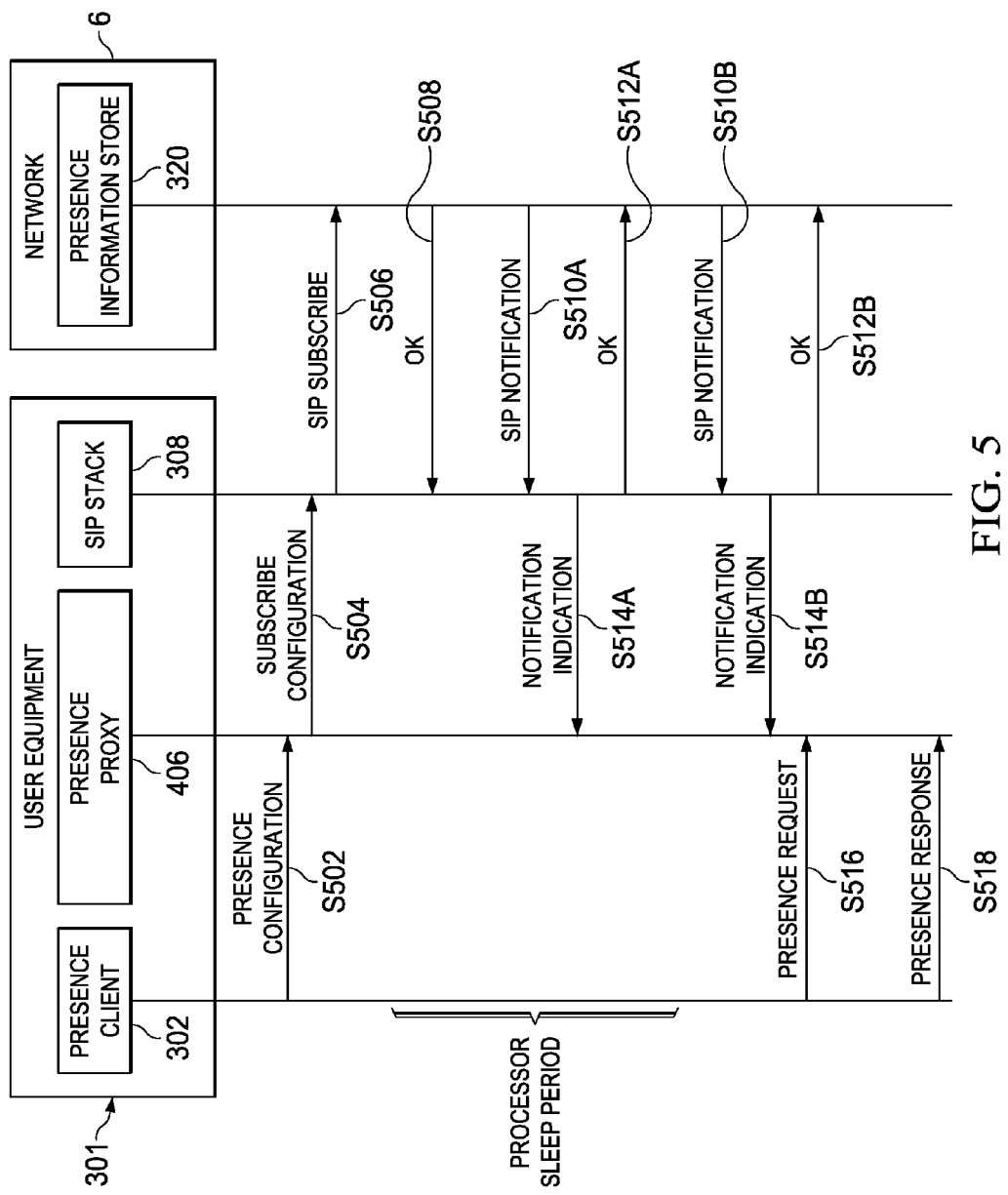
FIG. 5 is a signalling chart representing a method of handling presence notifications.

FIG. 5 is a signalling chart illustrating a method according to an embodiment of the disclosure.

The signalling chart of FIG. 5 is described with reference to the User Equipment 301 shown in FIG. 4. At step S502, the presence client software 302 when executed on the host processor 30 of the host terminal 2, transmits presence configuration information to the modem 4. The present configuration information may be entered by user A via a user interface of the client communication application displayed on the host terminal 2 and received by the presence client software 302 due to the interworking between the client communication application and presence client software 302. The presence configuration information may be sent from the presence client software 302 to the modem processor 33 in the form of an AT command, and received at the modem processor 33 via the AT command interface 404.

The presence configuration information indicates what events related to User A's contacts that User A wants to subscribe to i.e. the events that User A wants to be notified of whenever they occur.

Upon the modem processor 33 receiving the presence configuration information, the presence proxy 406 supplies subscribe configuration information to SIP stack 308 at step S504. The subscribe configuration information supplied from presence proxy 406 to the SIP stack 308 at step S504 comprises the presence configuration information to enable the SIP stack 308 to transmit a request to the network 6 for the presence configuration information.

At step S506 the SIP stack 308 transmits a request to the network 6 based on the information in the subscribe configuration information received from the presence proxy 406. That is, the SIP stack transmits an SIP subscribe message to the network 6, the SIP subscribe message comprising the presence configuration information received at the modem at step S502.

The SIP subscribe message is transmitted to a presence information store 320 located in the network 6. The presence information store 320 may for example be a presence server. In response to receiving the SIP subscribe message, the presence information store 320 transmits an acknowledgement of safe receipt of the request in the form of a SIP OK message at step S508. At this stage in the process, the presence information store 320 located in the network 6 knows what presence information should be delivered to the User Equipment 301.

Referring back to the presence environment described above with reference to FIG. 3. The presence information store 320 located in the network 6 may be instructed by way of the SIP subscribe message to notify the User Equipment 301 of certain events related to User B associated with User Equipment 311. For example the SIP subscribe message may request that the User Equipment is 301 is notified every time User B's presence is changed to one of "online", "offline", "away", and "do not disturb". The SIP subscribe message may request that the User Equipment is 301 is notified every time User B's presence is changed to certain states but not others. For example SIP subscribe message may request that the User Equipment is 301 is notified every time User B's presence is changed to "online" but not when User B's presence is changed to "offline", "away", or "do not disturb". The presence information store 320 is made aware of any change of User B's presence state by the execution of the presence client software 312 on User Equipment 311.

When an event occurs that User A has subscribed to (by way of the SIP subscribe message), at step S510*a* the presence information store 320 notifies the SIP stack 308 of the corresponding event.

In known systems, once the SIP stack 308 had been notified of an event, a notification would be transmitted to the host processor 30 on the host terminal 2 executing the presence client software 302 so that User A's contact list is supplemented with presence information of User B.

In contrast, in the disclosure the presence proxy 406 handles any event locally at the modem 4. That is, upon being notified of an event the SIP stack 308 supplies a notification to the presence proxy 406, referenced by step S514*a*. At step S512*a* the SIP stack 308 acknowledges safe receipt of the notification transmitted at step S510*a*.

When a further event occurs that User A has subscribed to, at step S510*b* the presence information store 320 notifies the SIP stack 308 of the corresponding event. Upon being notified of the event the SIP stack 308 supplies a notification to the presence proxy 406, referenced by step S514*b*. At step S512*b* the SIP stack 308 acknowledges safe receipt of the notification transmitted at step S510*b*.

Presence notifications 514 received at the presence proxy 406 from SIP stack 308 are stored on a non-transitory computer-readable medium 34 of the modem 4 (not necessarily the same physical memory device as the rest of the soft modem code and/or the presence proxy code though it could be). The presence notifications 514 may be stored in storage 34 in the form of Extensible Markup Language (XML) files.

Thus, whilst the host processor 30 is in sleep mode, presence notifications are handled by the modem 4 and are not delivered to the presence client software 302 executed on the host processor 30. When the host processor 30 is "woken up", i.e. switched to operate in an awake mode, at step S516 the presence client software 320 executed on host processor 30 transmits a request for presence notifications to the presence proxy 406 on modem 4. The request transmitted at step S516 may take the form of an AT command. Alternatively, the request transmitted at step S516 may be transmitted in accordance with a proprietary communication protocol.

At step S518, the presence proxy 406 responds to the presence request. At step S518 the presence proxy 406 may deliver presence notifications 514 "blind". That is, any presence notifications 514 stored in the storage 34 may be delivered to the presence client software 302 without the presence proxy 406 implementing any further processing of the presence notifications 514.

Alternatively, the presence proxy 406 may only deliver the change in presence state since the last presence request received from the presence client software. For example, if in response to the last presence request the presence proxy service 406 delivered a presence notification that indicated that User B was "online" and whilst the host processor 30 was in sleep mode User B's presence state changed from "online" to "do not disturb" and then to "offline" then in response to a presence request received at step S516 from the presence client software 302 the presence proxy 406 would deliver a notification that User B's presence state has changed from "online" to "offline" without indicating the intermediate presence state of "do not disturb". Similarly, if in response to the last presence request the presence proxy service 406 delivered a presence notification that indicated that User B was "online" and whilst the host processor 30 was in sleep mode User B's presence state changed from "online" to "offline" and then back to "online" then in response to a presence request received from the presence client software 302 the presence proxy 406 would not deliver any presence notification in relation to User B.

Should the host processor 30 on the host terminal 2 receive any communication (not shown in FIG. 5), for example a voice or video call, or an instant message (IM), from User B whilst the host processor 30 is in sleep mode, the host processor 30 is arranged to be woken up.

Thus, embodiments of the disclosure advantageously alert a user to a received communication as soon as it occurs but does not waste power consumption of the host terminal 2 by not waking the host processor 30 from the sleep mode i.e. the host processor 30 is not switched to operate in an awake mode, for every single change in presence state of the user's contacts.

Embodiments of the disclosure are particularly advantageous for mobile devices such as a mobile telephone or tablet computer, due to the limited power supply of the devices.

It will be appreciated that the above embodiments have been described only by way of example, and other variants or application may be apparent to a person skilled in the art given the disclosure herein.

For instance, while embodiments above have been described in relation to certain standards such as 3GPP networks, Internet Protocol, Session Initiation Protocol, and so forth, these are not intended to be limiting and the disclosure may in fact be applied within any communication standard of any mobile cellular network, or of any packet-based network if such a network is involved. Nor do the terms "context" or "channel" imply a specific nature or standard, but can be used to refer to any kind of suitable data conduit or session established between a modem and a network The portions of code 35 referred to above to implement presence proxy 406, SIP, TCP, and IP processing (shown by blocks 308 and 410) and the 3GPP stack 412 may be portions of the same code stored in the same physical memory device. Alternatively the code 35 referred to above to implement presence proxy 406, SIP, TCP, and IP processing (shown by blocks 308 and 410) and the 3GPP stack 412 may be separate portions of code stored in respective physical memory devices.

The disclosure is not limited by the described examples but only by the appended claims.

The invention claimed is:

1. A modem for use at a terminal, the modem comprising:
   a first interface arranged to connect to a network;
   a second interface arranged to connect to a host processor on the terminal; and
   a modem processor arranged to receive presence configuration information from the host processor via the second interface and in response to receiving the presence configuration information the modem processor is arranged to transmit a request comprising the presence configuration information via the first interface to a presence information store;
   wherein the modem processor is further arranged to receive one or more notifications with presence information from the presence information store via the first interface based on the presence configuration information in the request, the presence information supplied to the presence information store by one or more further terminals associated with one or more users;

wherein the modem processor is further arranged to store the one or more notifications in a storage means coupled to the modem processor, and in response to receiving a request for presence information from said host processor via the second interface, to supply presence information to the host processor based on the one or more notifications stored in the storage means.

2. The modem of claim 1, wherein the presence information supplied to the host processor comprises the one or more notifications stored in the storage means.

3. The modem of claim 1, wherein the modem processor is arranged to:
  upon receiving the request for presence information from said host processor, determine a current presence status of the one or more users from the one or more notifications received via the first interface, and
  determine whether the current presence status is different to a previous presence status of the one or more users at a time when the modem processor received a previous request for presence information from said host processor; wherein if the current presence status of the one or more users is different to the previous presence status of the one or more users, the presence information supplied to the host processor only indicates the current presence status of the one or more users.

4. The modem of claim 1, wherein the one or more notifications are stored in the storage means in the form of one or more Extensible Markup Language (XML) files.

5. The modem of claim 1, wherein the modem processor is arranged to transmit the request as a Session Initiation Protocol (SIP) message.

6. The modem of claim 1, wherein the modem processor is arranged to receive the one or more notifications in the form of one or more Session Initiation Protocol messages.

7. The modem of claim 1, wherein the modem processor is arranged to receive the presence configuration information from the host processor via the second interface in an Attention (AT) Command.

8. The modem of claim 1, wherein the terminal comprises a housing and the modem is an internal module within said terminal housing.

9. The modem of claim 8, wherein the second interface comprises a wired connector or connection within said terminal housing to connect to the host processor.

10. The modem of claim 8, wherein the first interface connects to a first wireless transceiver of said terminal for connecting to the network.

11. The modem of claim 1, wherein the modem comprises an external unit for use at the terminal.

12. The modem of claim 11, wherein the second interface is a Universal Serial Bus (USB) interface.

13. The modem of claim 11, wherein the modem comprises a dongle housing, said modem for plugging into said terminal via the second interface.

14. The modem of claim 11, wherein the first interface comprises a first wireless transceiver for connecting to the network.

15. The modem of claim 11, wherein the second interface comprises a second wireless transceiver for connecting to the terminal via a local wireless connection.

16. The modem of claim 1, wherein the modem comprises a mobile phone housing for connecting to said terminal via the second interface, the mobile phone thus being operable as a telephone and as an external wireless cellular modem for the terminal.

17. A computer program product for operating a modem for use at a terminal, the modem having a modem processor, a first interface for connecting to a network, and a second interface for connecting to the terminal;
  wherein the computer program product comprises code embodied on a non-transitory computer-readable medium and configured so as when executed on the modem processor to:
  receive presence configuration information from a host processor on the terminal via the second interface;
  in response to receiving the presence configuration information, transmit a request comprising the presence configuration information via the first interface to a presence information store;
  receive one or more notifications with presence information from a presence information store via the first interface based on the presence configuration information in the request, the presence information supplied to the presence information store by one or more further terminals associated with one or more users;
  store the one or more notifications in a storage means; and
  receive a request for presence information from said host processor via the second interface and in response to receiving said request, supply presence information to the host processor based on the one or more notifications stored in the storage means.

18. A method of operating a modem at a terminal, the modem having a first interface for connecting to a network and a second interface for connecting to a host processor on the terminal, wherein the method comprises:
  receiving presence configuration information from the host processor via the second interface;
  in response to receiving the presence configuration information, transmitting a request comprising the presence configuration information via the first interface to a presence information store;
  receiving one or more notifications with presence information from a presence information store via the first interface based on the presence configuration information in the request, the presence information supplied to the presence information store by one or more further terminals associated with one or more users;
  storing the one or more notifications in a storage means; and
  receiving a request for presence information from said host processor via the second interface and in response to receiving said request, supplying presence information to the host processor based on the one or more notifications stored in the storage means.

19. A system comprising:
  a terminal;
  a network; and
  a modem for use at the terminal, the modem comprising:
  a first interface arranged to connect to the network;
  a second interface arranged to connect to a host processor on the terminal; and
  a modem processor arranged to receive presence configuration information from the host processor via the second interface and in response to receiving the presence configuration information the modem processor is arranged to transmit a request comprising the presence configuration information via the first interface to a presence information store;
  wherein the modem processor is further arranged to receive one or more notifications with presence information from the presence information store via the first interface based on the presence configuration information in the request, the presence information supplied to the presence information store by one or more further terminals associated with one or more users;

wherein the modem processor is further arranged to store the one or more notifications in a storage means coupled to the modem processor, and in response to receiving a request for presence information from said host processor via the second interface, to supply presence information to the host processor based on the one or more notifications stored in the storage means.

* * * * *